United States Patent [19]

Hansen et al.

[11] Patent Number: 5,061,948

[45] Date of Patent: Oct. 29, 1991

[54] ELECTROGRAPHIC MARKING WITH MODIFIED ADDRESSING TO ELIMINATE STRIATIONS

[75] Inventors: Lorin K. Hansen, Fremont; Edwardo D. Lara, Sacramento; William A. Lloyd, Los Altos, all of Calif.; Jack H. Sayre, St. John, Canada; Stephen D. White, Santa Clara, Calif.

[73] Assignee: Xerox Corporation, Stamford, Conn.

[21] Appl. No.: 532,467

[22] Filed: May 30, 1990

[51] Int. Cl.[5] .............................................. G01D 15/06

[52] U.S. Cl. ..................................... 346/155; 346/154

[58] Field of Search .............................. 346/153.1-155

[56] References Cited

U.S. PATENT DOCUMENTS

| | | | |
|---|---|---|---|
| 4,215,355 | 7/1980 | Moore | 346/155 |
| 4,257,051 | 3/1981 | Lindsay et al. | |
| 4,271,417 | 3/1981 | Blumenthal et al. | 346/154 |
| 4,438,444 | 3/1984 | Komada et al. | 346/155 |
| 4,476,473 | 10/1984 | Wako | 346/155 |
| 4,488,160 | 12/1984 | Tarumi et al. | 346/154 |
| 4,488,161 | 12/1984 | Tsutsumi et al. | 346/155 |
| 4,544,934 | 10/1985 | Owada et al. | 346/154 |
| 4,553,150 | 11/1985 | Katahira | 346/154 |

FOREIGN PATENT DOCUMENTS

| | | |
|---|---|---|
| 118043 | 10/1978 | Japan . |
| 136832 | 11/1978 | Japan . |
| 4048 | 1/1980 | Japan . |
| 158270 | 9/1983 | Japan . |

*Primary Examiner*—George H. Miller, Jr.
*Attorney, Agent, or Firm*—Serge Abend

[57] ABSTRACT

In a device for producing an electrostatic image along a scan line of a recording medium by means of a recording device including an array of stylus electrodes arranged in a series of groups cooperable with a series of complementary electrodes, each of the stylus electrode groups cooperates with a portion of two adjacent complementary electrodes whereby writing is accomplished by imposing a charge pattern upon the recording medium in the region of a stylus electronic group when both the stylus electrode group and its cooperating pair of complementary electrodes are actuated contemporaneously. As each complementary electrode is actuated it induces a non-uniform residual potential distribution in the recording medium of a portion of the region of the next adjacent stylus electrode group. The electrostatic writing method comprises first perturbing a region of the recording medium by imposing a first non-uniform residual potential distribution on one portion thereof coextensive with the overlapping portion of a complementary electrode, then perturbing another portion of the same region by imposing a second non-uniform residual potential distribution thereon coextensive with the overlapping portion of another adjacent complementary electrode, wherein the first and second non-uniform residual potential distributions tend to cancel one another, and then writing a charge pattern upon the entire region.

8 Claims, 7 Drawing Sheets

ELECTROGRAPHIC MARKING WITH MODIFIED ADDRESSING TO ELIMINATE STRIATIONS

FIELD OF THE INVENTION

This invention relates to electrostatic recorders in which writing is accomplished by contemporaneously pulsing the voltage of groups of recording stylus, connected in parallel and arranged in an array, with selected complementary electrodes. More particularly, it relates to selecting a pulsing sequence for the complementary electrodes which minimizes non-uniform potential variations in area of the recording medium upon which writing is to occur, in order to eliminate visible striations.

BACKGROUND OF THE INVENTION

Electrographic marking upon an image recording medium comprises a two-stage process. First, air irons are created and charged ions of a given sign (usually negative) are deposited at selected image pixel locations to form an electrostatic charge on a recording medium. Then, the electrostatic charge image is made visible by "toning", which usually involves the passing of the recording medium, bearing the latent non-visible) image, into contact with a liquid solution containing positively charged dye particles in a colloidal suspension. The dye particles will be attracted to the negative charge pattern and the density of the dyed image will be proportional to the potential or charge on the medium.

Two types of recording media that are in common usage are paper and film. The paper is usually treated to make its bulk conductive and a dielectric layer of about 0.5 mil thick is coated upon its image bearing side. In its dielectric film form, a substrate such as Mylar®, has a very thin conductive layer and an overcoat dielectric layer coated upon its image bearing side. Conductive side stripes pass through the dielectric layer to the conductive layer provide electrical paths to the conductive layer. In the case of paper, the potential established in the conductive layer is obtained by a combination of resistive and capacitive coupling, and in the case of film, the potential established in the conductive layer is obtained by capacitive coupling.

Conventionally, as illustrated in FIG. 1, an electrostatic image is formed upon a recording medium 10 having a thin surface dielectric layer 12 coated upon a conductive paper base material 14. The recording medium is passed between a recording head 16 and an array of complementary electrodes 18. The recording head includes an array of recording stylus electrodes 20, divided into groups, embedded in a dielectric supporting member 22. In the drawing, the complementary electrodes are in the form of backplates which conform to the contour of the recording medium for intimate contact therewith. Alternatively, they may straddle the stylus electrodes, on the same side of the recording medium. Throughout this document the term backplate will be used interchangeably with complementary electrode and it should be understood that frontplate electrodes are contemplated as well.

When the potential difference between the stylus electrodes and the recording medium conductive layer arises enough to cause the voltage in the air gap to exceed the breakdown threshold of the air, the air gap becomes ionized and air ions of the opposite sign to the potential of the conductive layer are attracted to the surface of the dielectric layer. As the dielectric surface charges up, there is a corresponding drop in voltage across the gap, so that when the voltage across the gap below the maintenance voltage of the discharge, the discharge extinguishes, leaving the dielectric surface charged. The discharge potential is established by applying a voltage of a first polarity, e.g. on the order of −300 volts, to the stylus electrodes contemporaneously with the application of a substantially equal of the opposite polarity, e.g. +300 volts, to the complementary electrodes. This causes the electrical discharge, imposing a localized negative charge to the surface of the dielectric layer 12 of the recording medium.

Typical electrographic plotters range in width from 11 inches to 44 inches, and in some cases even as wide as 72 inches, with the writing head stylus array extending across the width. Since images are usually formed at resolutions of 200 to 400 dots per inch, there are from 2000 to over 17,000 styli in a single array. Because of this very large number of styli it is not yet economically attractive to use one driver or switch per stylus. For this reason, a multiplexing arrangement is commonly used in conjunction with the discharge method described above wherein one part of the total voltage, necessary for electrographic writing, is imposed upon a stylus group and the remaining part of the necessary voltage is imposed upon its complementary electrode. The styli in the writing head array are divided into stylus electrode groups (each group being about 0.5 inch to 1.5 inches in length) so that each may consist of several hundred styli.

In order to reduce the number of drivers needed, since one driver can be used for many styli, the groups of the stylus electrodes are wired in parallel so that like styli in each group carry the same information. Then, in order to cause a selected stylus group to write, its complementary electrode is selectively pulsed. In FIG. 2 there is illustrated the conventional form for the multiplexed addressing of two sets of alternating stylus groups (referred to as As and Bs). The recording medium 10 passes between the stylus groups 20 and the backplates 18. Each commonly numbered stylus in each A-stylus group is wired in parallel with each like numbered stylus in every other A-stylus group. Similarly, all B-stylus groups are wired in parallel. Each of the stylus groups is the same length as the complementary electrode and they are offset with respect to one another so that two adjacent complementary electrodes are needed to cause a writing discharge from one stylus group. By having two complementary electrodes generally centered relative to a given selected stylus group, the voltage across the recording medium can be expected to be uniform. Although the leading and trailing stylus groups adjacent to the given selected stylus group are also influenced by an overlapping portion of the selected complementary electrodes they will not write because they are not addressed and enabled.

Generally, the firing sequence in electrographic plotters, having multiplexed stylus groups, is sequentially from one end of the writing head to the other. Such a firing sequence of the stylus groups with their associated complementary (backplate (BP)) electrodes is shown in Table 1. In associated FIG. 3 this firing sequence is diagrammatically shown in a format which will be used throughout this description. The array of rectangles 24 in the upper row represent the stylus groups, the array of rectangles 26 in the lower row represent the complementary (backplate) electrodes, and the arrows 28 indicate the firing sequence of the stylus groups.

TABLE 1

| Stylus Group | Backplates |
|---|---|
| $A_1$ | $BP_1$, $BP_2$ |
| $B_1$ | $BP_2$, $BP_3$ |
| $A_2$ | $BP_3$, $BP_4$ |
| $B_2$ | $BP_4$, $BP_5$ |
| $A_3$ | $BP_5$, $BP_6$ |
| $B_3$ | $BP_6$, $BP_7$ |
| etc. | etc. |

It can be seen readily from Table 1 and FIG. 3 that in order for a given stylus group to write, it is necessary for a pair of overlapping backplates to be pulsed. However, because each backplate overlaps an adjacent, non-written stylus group, its pulse introduces an unwanted potential change therein immediately prior to writing by the next stylus group. For example, the portion of backplate $BP_2$ overlying a portion of stylus group $B_1$ introduces a potential variation, or perturbation, in the conductive layer of the recording medium in that region, immediately before stylus group $B_1$ is to write.

Whenever the potential of a conductive layer is changed by pulsing a pair of backplate electrodes relative to the remaining backplate electrodes, which are maintained at a reference potential, the potential difference will cause current flow through it. When the pulse is extinguished, the current flows back. These is an RC time constant associated with these current flows which are the source of perturbations in the recording medium. The time scale for relaxation of the induced charges in film is on the order of tenths of milliseconds. Writing occurring upon a perturbed region of the recording medium, which perturbation has not dissipated completely, will be affected thereby and will result in visible non-uniformities in the printed information. Such image defects that were once acceptable for line and text on paper now become unacceptable as the transition is made to large solid area fill, solid modeling and full-color scanned image reproduction. This defect arising from multiplexed electrographic plotting appears as the striations (rather than uniformly printed areas) in FIG. 4. These striations are particularly observable when writing on film and are less pronounced when writing on paper.

Another cause of striations (which will not be discussed herein) is the subject of a related patent application filed contemporaneously herewith, identified by U.S. Ser. No. 07/530,719, entitled "Electrographic Marking With Dithered Stylus Group Boundaries To Eliminate Striations". It relates to the formation of objectionable striations at the electrode group boundaries, due to pulsing of the stylus electrode groups themselves.

It is the primary object of the present invention to improve the uniformity of writing upon a region of the recording medium having been perturbed by an overlapping complementary electrode.

It is another object of the present invention to substantially reduce striation defects by generating a counteracting perturbation so as to allow opposing slowly dissipating potential gradients to cancel one another.

It is yet another object of the present invention to avoid minor striations, caused by the asymmetrical sequencing of alternate stylus electrode groups by alternating the leading group in alternate scan lines.

SUMMARY OF THE INVENTION

These and other objects may be carried out, in one form, by producing an electrostatic image along a scan line of a recording medium by means of a recording device including an array of stylus electrodes arranged in a series of groups cooperable with a series of complementary electrodes. Each of the stylus electrode groups cooperates with a portion of two adjacent complementary electrodes whereby writing is accomplished by imposing a charge pattern upon the recording medium in the region of a stylus electrode group when both the stylus electrode group and its cooperating pair of complementary electrodes are actuated contemporaneously. As each complementary electrode is actuated it induces a non-uniform residual potential distribution in the recording medium of a portion of the region of the next adjacent stylus electrode group. The present electrostatic writing method comprises first perturbing a region of the recording medium by imposing a first non-uniform residual potential distribution on one portion thereof coextensive with the overlapping portion of a complementary electrode, then perturbing another portion of the same region by imposing a second non-uniform residual potential distribution thereon coextensive with the overlapping portion of another adjacent complementary electrode, wherein the first and second non-uniform residual distributions tend to cancel one another, and then writing a charge pattern upon the entire region.

BRIEF DESCRIPTION OF THE DRAWINGS

Other objects and further features and advantages of this invention will be apparent from the following, more particular, description considered with the accompanying drawings, wherein.

DETAILED DESCRIPTION OF THE PREFERRED EMBODIMENTS

A more complete understanding of the time variation of the potential distribution in the conductive layer under the influence of the pulsed complementary electrodes may be seen in the illustrations of FIGS. 5*a* through 5*f* showing graphical representations of the potential variations across a stylus group $A_1$ under a pair of backplate electrodes $BP_1$ and $BP_2$ and its subsequent effect upon the recording medium region $B_1$. It should be noted that the recording medium represented in FIGS. 5*a* to 5*e* is devoid of any perturbations, those which may have existed previously having been completely relaxed out. For ease of illustration, it is assumed that all the stylus electrodes, in the group under consideration, are pulsed ON as they would be when writing solid areas. As a representative case, for the sake of discussion, the complementary electrodes are pulsed ON (positive voltage) for 1RC time constant (approximately 20 $\mu$s) and OFF for 4RC time constants (approximately 80 $\mu$s) before the next adjacent stylus group $B_1$ and its backplate electrodes $BP_2$ and $BP_3$ are pulsed. R represents the recording medium resistivity in ohms/-square, and C represents the capacitance of the conductive layer to the backplates in coulombs/volt·cm$^2$.

Figure 5A:
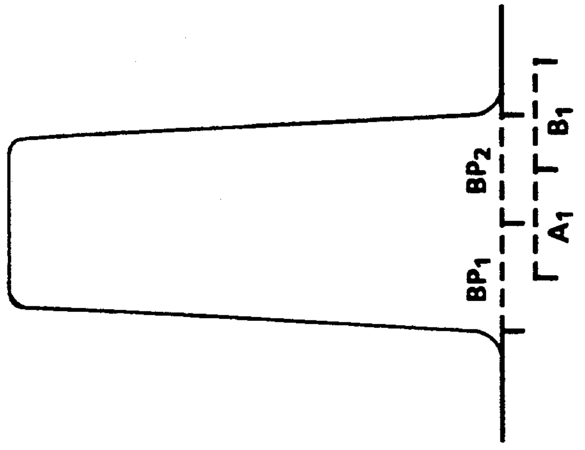
FIGS. 5*a* through 5*f* are graphical illustrations of potential variations in the recording medium taking at different times after an initial pulse.

FIG. 5*a* represents a switching a switching ON (to a writing level of about +300 bolts) of backplate electrodes for writing on first region $A_1$ at time t=0.

Figure 5B:
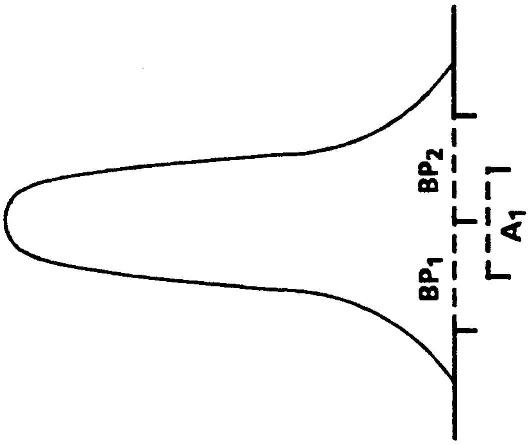

FIG. 5*b* represents the potential distribution in the conductive layer after some dissipation at time $t=\frac{3}{4}$ RC.

Figure 5C:
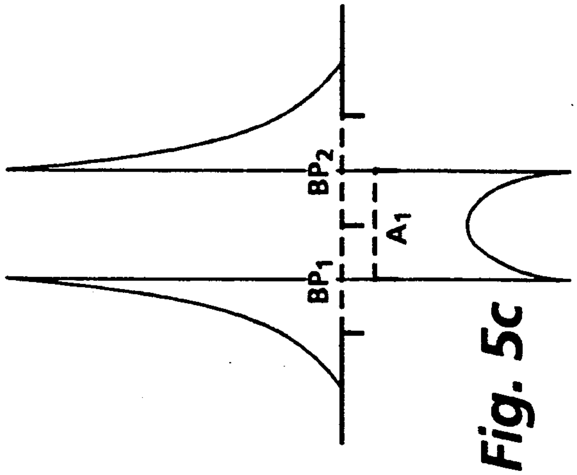

FIG. 5*c* represents a switching OFF of the backplate electrodes (to a reference level of about 0 volts) at time t=1RC. The potential in the recording medium will overshoot in the negative direction because the backplate electrodes drop by about 300 volts and the capacitively coupled recording medium instantaneously follows by a like amount.

Figure 5D:
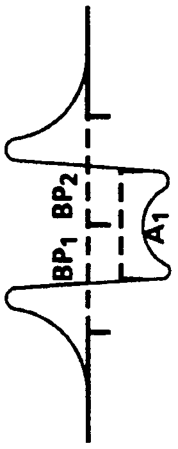
Figure 5E:
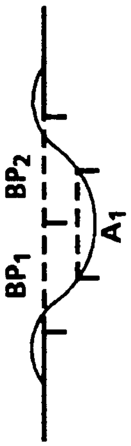

FIGS. 5*d* and 5*e* represent a further relaxing away of the overshoot potential over time at t=2RC and t=4RC, respectively. The potential gradients are very small at this point since residual perturbations dissipate very slowly and a potential distribution close to that of FIG. 5*e* remains for a long time.

Figure 5F:
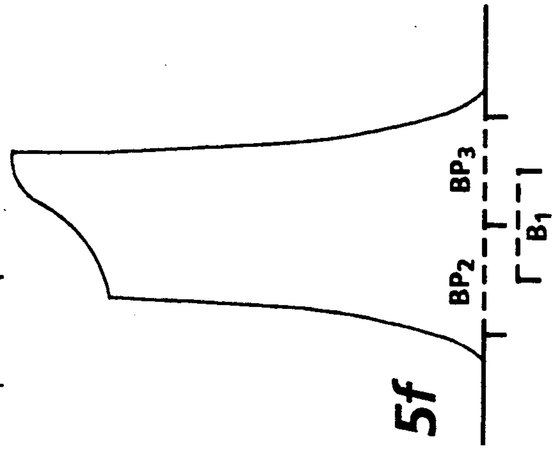

In FIG. 5*f* it can be seen that the residual potential of FIG. 5*e*, in the overlapping portion of $BP_2$, is superimposed upon the high potential writing pulse of $BP_2$ and $BP_3$ for the stylus group $B_1$.

Figure 3:
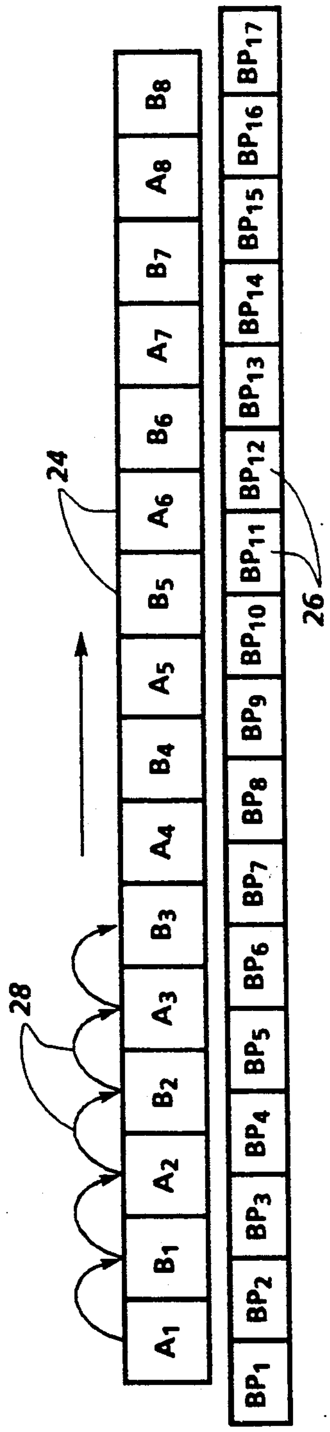
Fig.3 (Prior Art)
FIG. 3 is a symbolic representation of the firing sequence for conventional sequential electrographic writing.

Therefore, when writing with a firing sequence similar to Table 1 and FIG. 3, rather than obtaining a uniform potential distribution for stylus groups $B_1$, $A_2B_2$, $A_3$, $B_3$, etc. similar to that obtained for $A_1$, the writing on similarly perturbed regions will be non-uniform. The resultant sawtooth potential pattern seen in FIG. 6 can be visually observed as the varying density regions or striations in FIG. 4.

Figure 4:
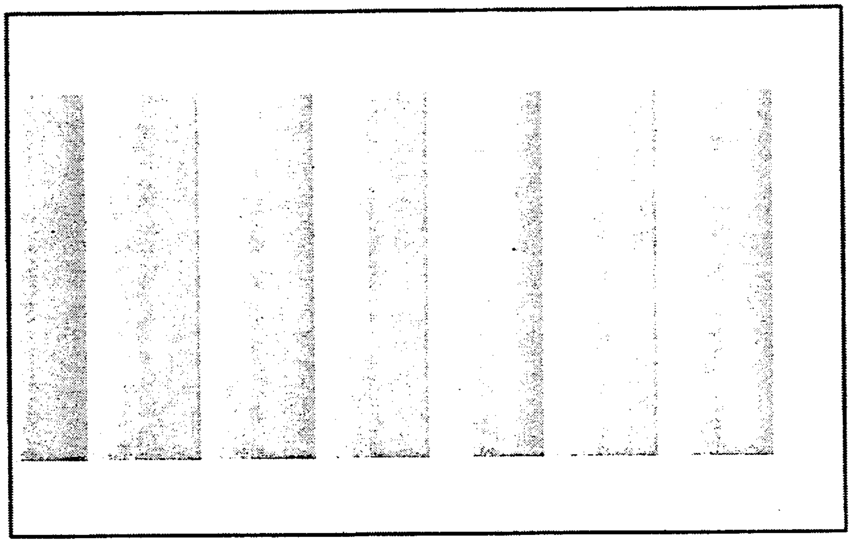
Fig. 4 (Prior Art)
FIG. 4 is a reproduction of the striation defect evident in solid area writing using the conventional sequential electrographic writing.
Figure 6:
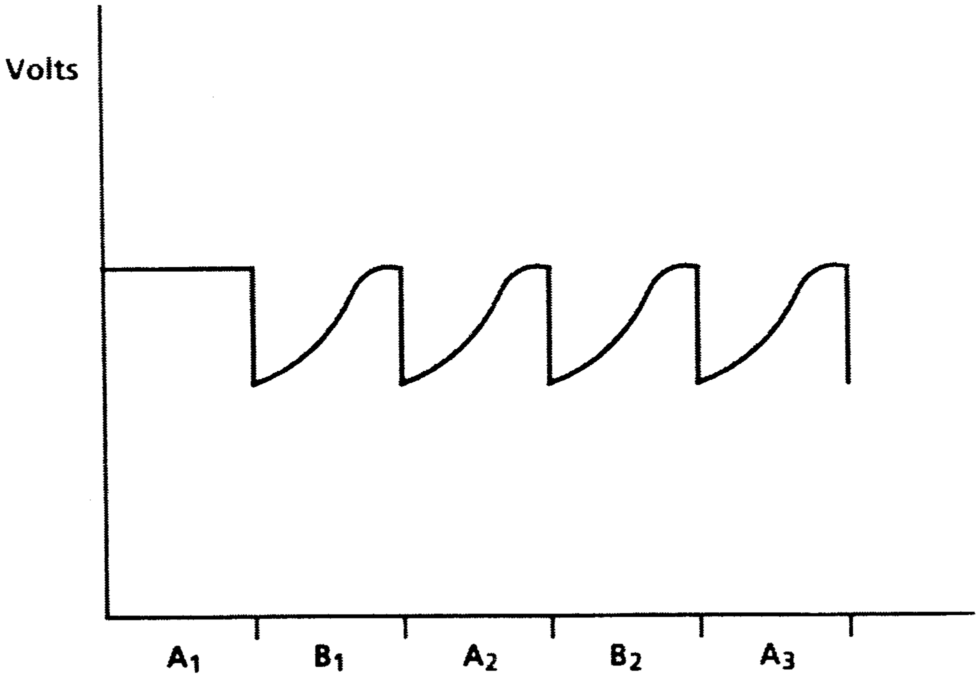
FIG. 6 is a graphical illustration of the sawtooth potential variations observable in FIG. 4.

It has been assumed that the non-uniformity evidenced in FIGS. 4 and 6 could be avoided by delaying the writing upon a region for a time long enough to allow the perturbation to dissipate completely before writing upon that region. To that end, it has been suggested that no complementary electrode be twice actuated without the intervening actuation of at least one other complementary electrode. In other words, no two adjacent stylus groups should be written sequentially in order to allow the recording medium to relax completely. We have found that while the sharpest potential gradients (FIG. 5*c*) decay rapidly, the slow potential gradients (FIG. 5*e*) decay very slowly. Therefore it is not practical in a high speed printing system, where the recording medium is being continuously advanced, to wait until the slow gradients decay out completely before pulsing a previously pulsed complementary electrode. To do so would give rise to objectionable discontinuities ("jaggies") between the writing of two adjacent stylus groups.

Writing can be said to take place on two types of regions on the recording medium; pristine (i.e. which has not been perturbed from adjacent writing in a given scan line) and perturbed. In the present invention, we have determined that when it is not possible to write upon pristine recording material, it is also satisfactory to write upon a region that has been perturbed from both its leading and trailing sides (i.e. from right and left). In this manner, the induced perturbations on each region are in opposite directions and oppose one another (i.e. sawtooths in opposite directions). In accordance with our invention, the firing sequence of the stylus electrode groups should take place in the pattern {+n, −(n−2)} where n represents an odd number of stylus electrode groups. Instead of incrementally advancing one group at a time, as has been conventionally accomplished, writing takes places in a step forward and step return manner. On the forward step {+n} the written group is always on a clean region of the recording medium while on the return step {−(n−2)} the written group is always on a perturbed region. However, each perturbed region has been twice perturbed so that its leading portion and its trailing portion have potential gradients which effectively cancel one another. By cancellation we mean there is no asymmetric potential gradient as illustrated in FIG. 5*f*.

Figure 7:
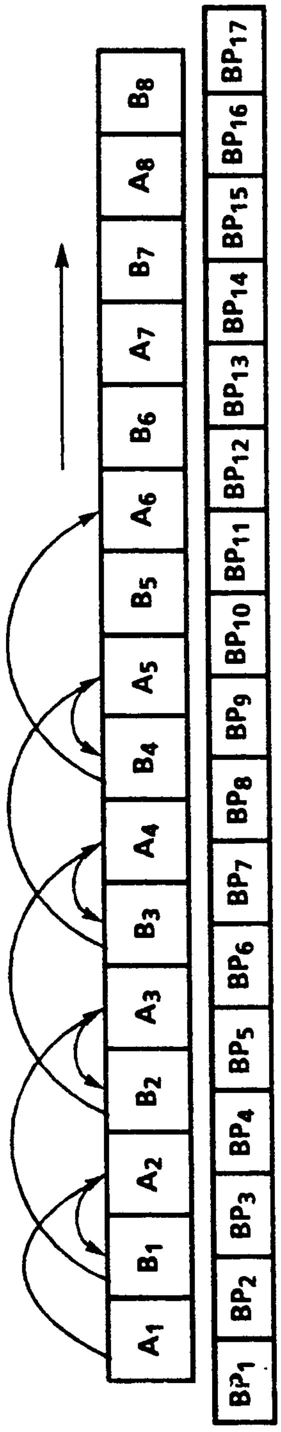
FIG. 7 is a symbolic representation, similar to that of FIG. 3, showing a forward and return firing sequence along a scan line in accordance with the writing method of the present invention, in which the A stylus electrode groups are leading.

In Table 2 and in related FIG. 7 the firing sequence is set forth for a {+3, −1} scheme. It should be noted than on each forward step an A group is writing and on each return step a B group is writing. Therefore, the A groups will always be writing on pristine recording material and the B groups will always be writing on perturbed, albeit more uniform, recording material. In this firing sequence a directly adjacent stylus group region is always written on the return {−1} step but it will have been already perturbed from the left and from the right before being written upon.

Figure 8:
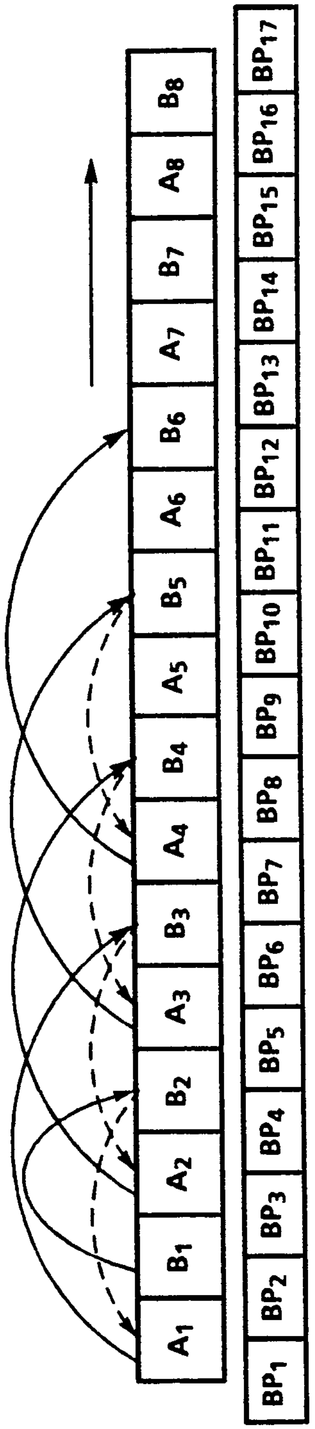
FIG. 8 is a symbolic representation, similar to that of FIG. 3, showing another forward and return firing sequence in accordance with the writing method of the present invention, in which the B stylus electrode groups are leading.

In Table 3 and in related FIG. 8 the firing sequence is set forth for a {+5, −3} scheme. It should be noted that on each forward step a B group is writing and on each return step an A group is writing. Therefore, as opposed to previous example, the B groups will always be writing on pristine recording material and the A groups will always be writing on perturbed recording material. For all practical purposes it is not advised to extend the forward step by much more than {+7} because it is stretched out so far that by the time the next adjacent preceding stylus group is printed the recording medium will have been advanced sufficiently far that there will be an observable discontinuity between these two groups. In this and in the previous example it will be observed that notwithstanding the fact that the firing scheme is identified as an {+n, −(n−2)} type, the start of the first scan line will require a series of stylus electrode regions to be fired in order to set-up the sequence (namely, $A_1$ in Table 2 and $B_1$, $B_2$ and $A_1$ in Table 3). However, at the end of a row, the firing sequence will continue into the next row as if it were an extension of the preceding row.

TABLE 2

| Nib Group | Backplates |
|---|---|
| $A_1$ | $BP_1$, $BP_2$ |
| $A_2$ | $BP_3$, $BP_4$ |
| $B_1$ | $BP_2$, $BP_3$ |
| $A_3$ | $BP_5$, $BP_6$ |
| $B_2$ | $BP_4$, $BP_5$ |
| $A_4$ | $BP_7$, $BP_8$ |
| $B_3$ | $BP_6$, $BP_8$ |
| $A_5$ | $BP_9$, $BP_{10}$ |
| $B_4$ | $BP_8$, $BP_9$ |
| $A_6$ | $BP_9$, $BP_{10}$ |
| etc. | etc. |

There will be a slight difference in appearance between the stylus electrode groups written on a forward step and those written on a return step. Thus our writing pattern $\{+n, -(n-2)\}$ will result in some minor residual striations. These too may be overcome by our invention by alternating from line to line the leading group firing sequence (i.e. on one line A leading and on the next line B leading). In this way the plot averages to the eye and gives equal weight to the A and B stylus groups in the image.

TABLE 3

| Nib Group | Backplates |
|---|---|
| $B_1$ | $BP_2$, $BP_3$ |
| $B_2$ | $BP_4$, $BP_5$ |
| $A_1$ | $BP_1$, $BP_2$ |
| $B_3$ | $BP_6$, $BP_7$ |
| $A_2$ | $BP_3$, $BP_4$ |
| $B_4$ | $BP_8$, $BP_9$ |
| $A_3$ | $BP_5$, $BP_6$ |
| $B_5$ | $BP_{10}$, $BP_{11}$ |
| $A_4$ | $BP_7$, $BP_8$ |
| $B_6$ | $BP_{12}$, $BP_{13}$ |
| etc. | etc. |

As stated above, in order to start a scan line with A groups or B groups leading in the pattern $\{+n, -(n-2)\}$ it is necessary to start with a set-up series of a succession of A groups or B groups before alternating the groups. By alternating A groups leading and B groups leading, in order to fully eliminate striations, there will be a set-up sequence on each line, aggravated by larger n values. This rapid firing of a large number of A or B groups in succession could burden the duty cycle of the drivers. Furthermore, in many of assignees plotters already in the hands of customers the electronics is set up to alternate A and B group firings and this firing sequence could not be simply and inexpensively retrofit into those machines. Therefore, in those cases in which it is undesirable to fire the same groups in succession or it is necessary to alternate stylus group firing, another scheme is proposed.

Figure 9:
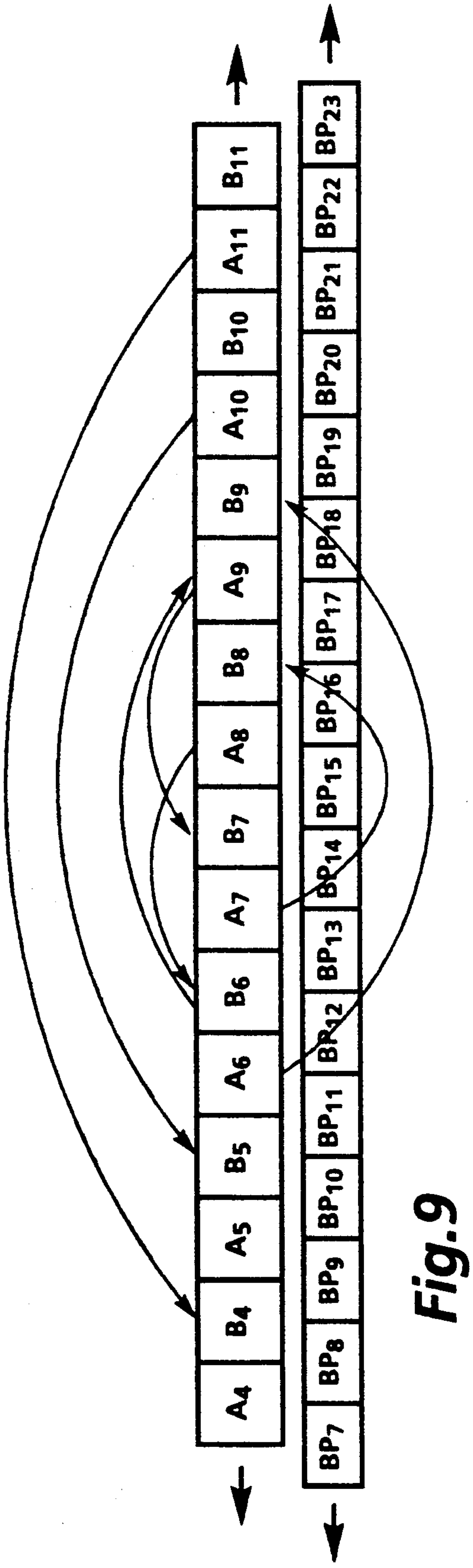
FIG. 9 is a symbolic representation showing a center-outward firing sequence.

In Table 4 and in related FIG. 9 the firing sequence is set forth for a $\{+5, -3\}$ "chevron" scheme (so called, because the movement of the recording medium will cause the scan line to taper slightly from the center outwardly). In this embodiment A groups and B groups always alternate. We begin writing a scan line in the center of the plotter (indicated as a heavy line in FIG. 9 and alternate from one side of center to the other. After the set-up series of firings ($A_8$, $B_6$, $A_9$ and $B_7$) the leading $\{5\}$ stylus groups on each side of the center are fired, followed by the return $\{-3\}$ stylus electrode groups. It can be seen that A groups lead on one side and B groups lead on the other.

TABLE 4

| Nib Group | Backplates |
|---|---|
| $A_8$ | $BP_{15}$, $BP_{16}$ |
| $B_6$ | $BP_{12}$, $BP_{13}$ |
| $A_9$ | $BP_{17}$, $BP_{18}$ |
| $B_7$ | $BP_{14}$, $BP_{15}$ |
| $A_{10}$ | $BP_{19}$, $BP_{20}$ |
| $B_5$ | $BP_{10}$, $BP_{11}$ |
| $A_7$ | $BP_{13}$, $BP_{14}$ |
| $B_8$ | $BP_{16}$, $BP_{17}$ |
| $A_{11}$ | $BP_{21}$, $BP_{22}$ |
| $B_4$ | $BP_8$, $BP_9$ |
| $A_6$ | $BP_{11}$, $BP_{12}$ |
| $B_9$ | $BP_{18}$, $BP_{19}$ |
| etc. | etc. |

Figure 10:
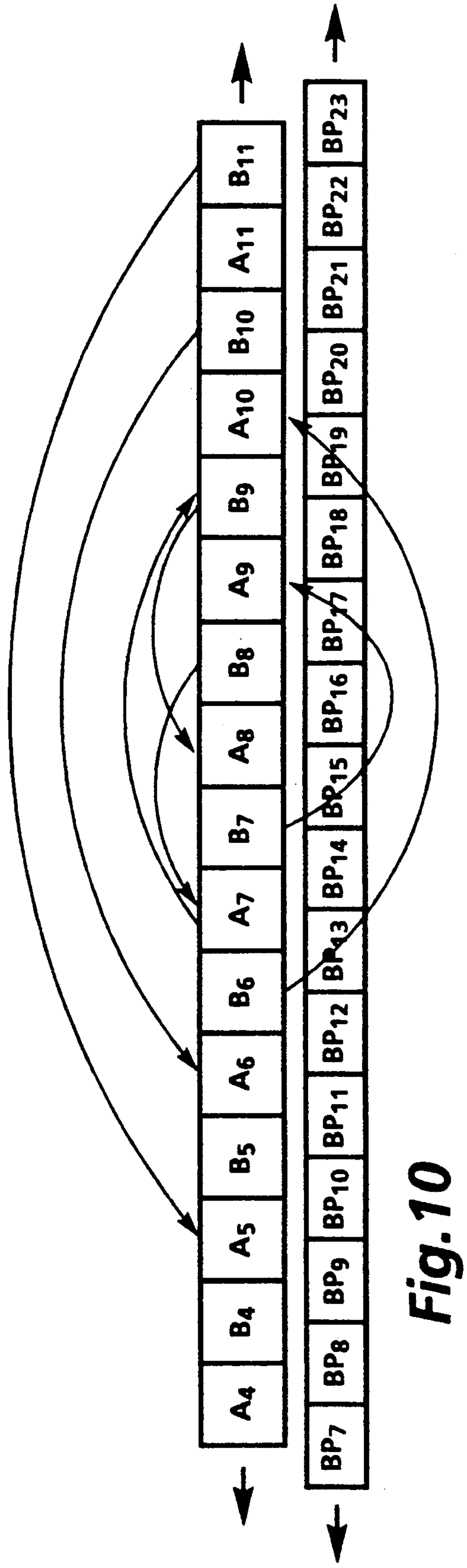
FIG. 10 is a symbolic representation showing the center-outward firing sequence with opposite stylus electrode groups leading.

In Table 5 and FIG. 10 an alternate $\{+5, -3\}$ "chevron" scheme is disclosed wherein the center is incremented by one stylus group (set-up starts at $B_8$ rather than $A_8$) so that A groups lead on opposite halves of the scan line. It is possible to incorporate both firing sequences so that on alternate scan lines each half will write with a different leading group. This will substantially eliminate all visible striations. In each of FIGS. 9 and 10 it should be understood that the scan line comprises 28 groups and that only the center of the plot is shown. Of course, the number of groups will be dictated by several factors including, the width of the plot and the width of the groups.

TABLE 5

| Nib Group | Backplates |
|---|---|
| $B_8$ | $BP_{16}$, $BP_{17}$ |
| $A_7$ | $BP_{13}$, $BP_{14}$ |
| $B_9$ | $BP_{18}$, $BP_{19}$ |
| $A_8$ | $BP_{15}$, $BP_{16}$ |
| $B_{10}$ | $BP_{20}$, $BP_{21}$ |
| $A_6$ | $BP_{11}$, $BP_{12}$ |
| $B_7$ | $BP_{14}$, $BP_{15}$ |
| $A_9$ | $BP_{17}$, $BP_{18}$ |
| $B_{11}$ | $BP_{22}$, $BP_{23}$ |
| $A_5$ | $BP_9$, $BP_{10}$ |
| $B_6$ | $BP_{12}$, $BP_{13}$ |
| $A_{10}$ | $BP_{19}$, $BP_{20}$ |
| etc. | etc. |

Figure 11:
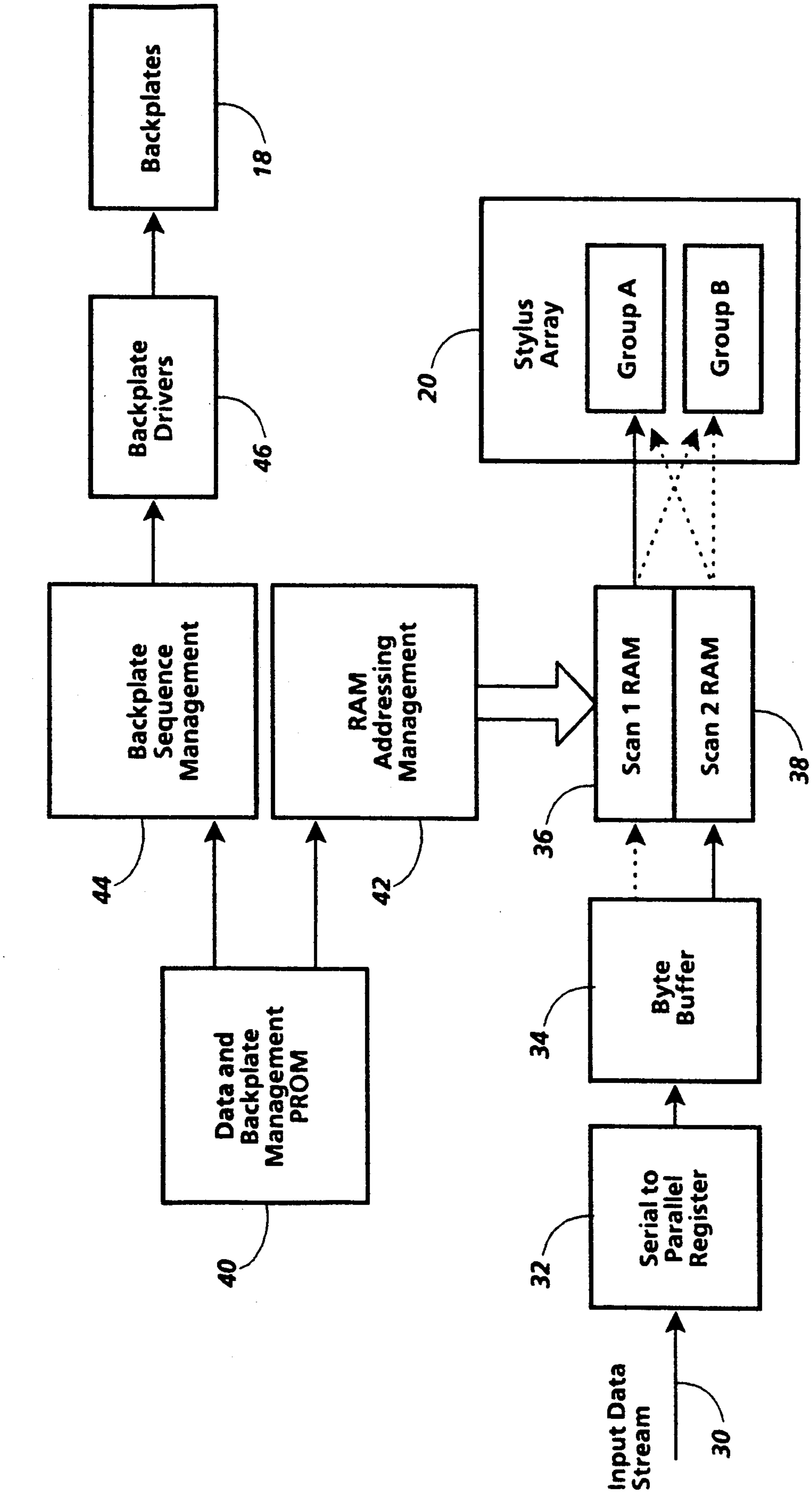
FIG. 11 is a block diagram of a control circuit for controlling the writing methods of the present invention.

Control of the firing sequence is effected by a circuit of the type shown in the block diagram of FIG. 11. An input serial data stream 30, received from an electronic buffer in the plotter (not shown), enters the Serial to Parallel Register 32 where it fills an eight bit register and moves out in bytes which fill the Byte Buffer 34. The bytes are passed serially first into scan 1 RAM 36 and then into Scan 2 RAM 38, each of which stores an entire scan line. Each stylus electrode group comprises a number of bytes (32 or 64) from the scan line of data bytes stored in one of the RAMs. The alternate feeding of data into each of the RAMs and then out of them is graphically indicated by the convention of using solid and dotted arrows, from which it can be seen that Scan 2 RAM is being loaded and that Scan 1 RAM has already been loaded and is being unloaded. The solid arrow emanating from Scan 1 RAM indicates data being unloaded to all the A group styli in the Stylus Array 20. Next, all the B groups will be loaded. After the entire scan line has been unloaded from Scan 1 RAM, Scan 2 RAM is unloaded in the same alternating manner while Scan 1 is being loaded with the next scan line of data.

Figure 1:
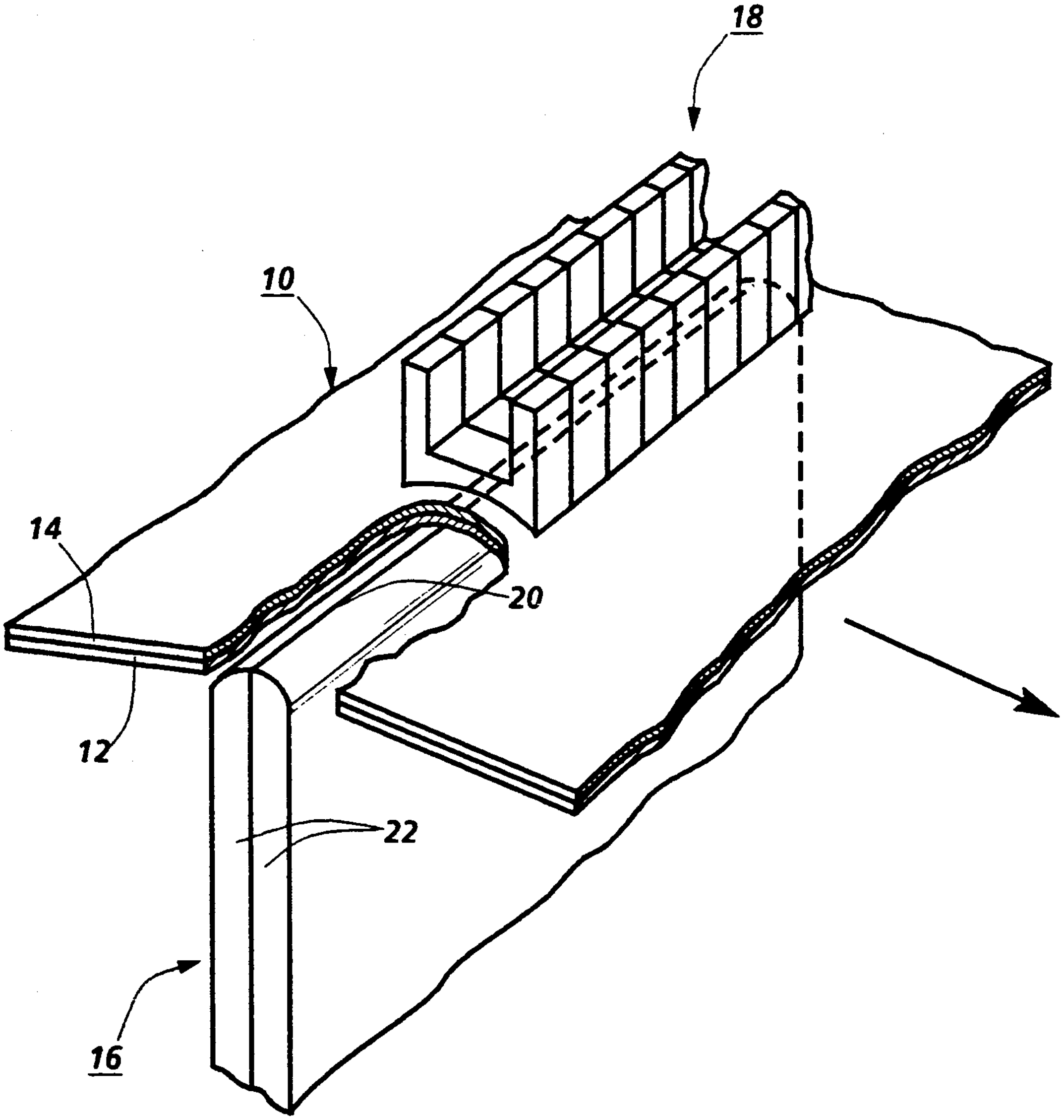
FIG. 1 is a perspective view showing a conventional electrographic writing head relative to a recording medium.
Figure 2:
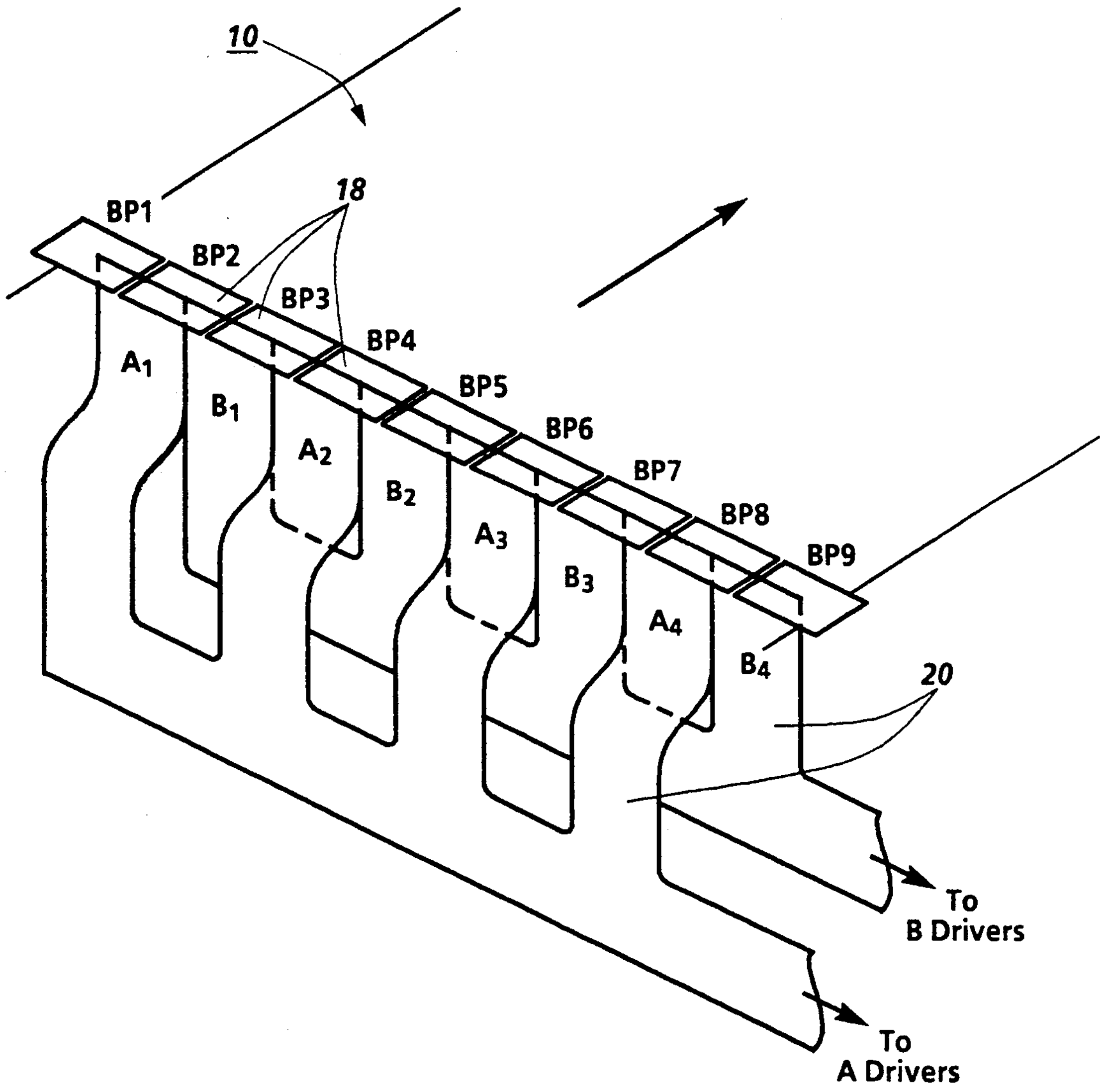
FIG. 2 is a schematic perspective view showing the interrelationship between the A and B writing groups and their complementary electrodes

As shown in the Tables and drawings, the firing sequence is not sequential, therefore the correct series of bytes for a given, selected, stylus electrode group must be picked from the Scan 1 RAM or Scan 2 RAM and sent to the Head in the proper order. This selection is effected by the Data and Backplate Management PROM 40 which instructs the RAM Addressing Management 42 and simultaneously instructs the Backplate Sequence Management 44 to control Backplate Drivers 46 for pulsing a pair of Backplates 18 coinciding with the selected stylus group electrodes (see FIG. 1).

It should be understood that the present disclosure has been made only by way of example and that numerous other changes in the sequence of operation of the plotter may be resorted to without departing from the true spirit and scope of the invention as hereinafter claimed.

What is claimed:

1. A method of producing an electrostatic image along scan lines of a recording medium utilizing a recording means including an array of stylus electrodes arranged in a series of groups cooperable with a series of complementary electrodes, each of said stylus cooperating with a portion of each of two adjacent complementary electrodes, wherein each of said two adjacent complementary electrodes also includes an outlying portion overlapping the next adjacent stylus group on its respective side of said stylus group, said recording medium including a conductive layer and a dielectric layer, whereby wetting is accomplished by sequentially depositing charge patterns upon said dielectric layer in regions coextensive with stylus electrode groups when one of said stylus electrode groups and a cooperating pair of complementary electrodes are pulse contemporaneously, the method comprising the steps of:

writing a charge pattern on a given region of said recording medium, corresponding to a given stylus electrode group, which simultaneously imposes potential perturbations on right and left side portions of adjacent left and right side stylus group regions respectively of said recording medium, said potential perturbations being produced by the overlapping portions of said complementary electrodes, writing a charge pattern on remote region of said recording medium, corresponding to a remote stylus electrode group, said remote region being spaced from said given region by an odd number {n} of entire stylus electrode groups in a first direction of said array, while simultaneously imposing residual potential perturbations on right and left side portions of adjacent left and right side stylus group regions respectively of said recording medium corresponding to the overlapping portions of said complementary electrodes.

writing on an information region of said recording medium, corresponding to another entire stylus electrode group, located between said given region and said remote region and spaced in a second direction, opposite to said first direction, from said remote region by {n−2} stylus electrode groups, said intermediate region bearing residual potential perturbations on both right and left side portions thereof, and repeating the steps of writing on regions spaced by {n} entire stylus electrode groups in said first direction followed by writing on regions spaced by {n−2} stylus electrode groups in said second direction.

2. The method of producing an electrostatic image as defined in claim 1 wherein said steps of writing on a given region, writing on a remote region and writing on an intermediate region take place alternately on both sides of the center of said scan line.

3. The method of producing an electrostatic image as defined in claim 1 wherein adjacent stylus electrode groups receive different data and are identified as a first group and a second group, and wherein said nth regions of one scan line are written by a number of said first group while said nth regions of the next subsequent line are written by a number of said second group.

4. A method of producing an electrostatic image along a scan line of a recording medium utilizing a recording means including an array of stylus electrodes arranged in a series of groups cooperable with a series of complementary electrodes, each of said stylus electrode groups cooperating with a portion of two adjacent complementary electrodes, said recording medium including a conductive layer and a dielectric layer, whereby writing is accomplished by depositing a charge pattern upon said dielectric layer in the region of a stylus electrode group when both said stylus electrode group and a cooperating pair of complementary electrodes are pulsed contemporaneously, the method comprising:

first perturbing a writing region of said recording medium, coextensive with a stylus electrode group, by causing a first non-uniform potential perturbation to be disposed upon one portion thereof, then perturbing said writing region further by imposing a second non-uniform potential perturbation upon another portion thereof, and then imposing a substantially uniform potential distribution upon said writing region over said first and second non-uniform potential perturbations, whereby said first and second non-uniform potential perturbations approximately cancel one another.

5. The method of producing an electrostatic image as defined in claim 4 wherein said steps of first perturbing said writing region, perturbing said writing region further and imposing a potential distribution upon said writing region take place alternately on both sides of the center of said scan line.

6. A method of producing an electrostatic image along a scan line of a recording medium utilizing a recording means including an array of stylus electrodes arranged in a series of groups cooperable with a series of complementary electrodes, each of said stylus electrode groups cooperating with a portion of two adjacent complementary electrodes, said recording medium including a conductive layer and a dielectric layer, whereby writing is accomplished by depositing a charge pattern upon said dielectric layer in the region of a stylus electrode group when both said stylus electrode group and a cooperating pair of complementary electrodes are pulsed contemporaneously, the method comprising the steps of alternately:

first depositing a charge pattern, coextensive with a stylus electrode group, upon a first portion of said recording medium having substantially no residual potential perturbations thereon, and then depositing a charge pattern, coextensive with a stylus electrode group, upon a another portion of said recording medium having residual potential perturbations upon two portions thereof, which residual potential perturbations approximately cancel out one another.

7. The method of producing an electrostatic image as defined in claim 6 wherein said steps of first depositing a charge pattern and then depositing a charge pattern take place alternately on both sides of the center of said scan line.

8. The method of producing an electrostatic image as defined in claim 6 wherein adjacent stylus electrode groups receive different data and are identified as a first group and a second group, and wherein said depositing upon said first portion of one scan line is performed by a member of said first group while said depositing upon said another portion of the next subsequent line is performed by a member of said second group.

* * * * *